United States Patent
Shapery et al.

(10) Patent No.: US 8,683,926 B2
(45) Date of Patent: Apr. 1, 2014

(54) CONTAINER TRANSPORT SYSTEM

(75) Inventors: Sandor Wayne Shapery, San Diego, CA (US); Raymond William Holdsworth, Jr., Palos Verdes Estates, CA (US)

(73) Assignees: Sandor Wayne Shapery, San Diego, CA (US); Raymond William Holdsworth, Jr., Palos Verdes Estates, CA (US)

( * ) Notice: Subject to any disclaimer, the term of this patent is extended or adjusted under 35 U.S.C. 154(b) by 697 days.

(21) Appl. No.: 12/577,012

(22) Filed: Oct. 9, 2009

(65) Prior Publication Data

US 2010/0219610 A1 Sep. 2, 2010

Related U.S. Application Data

(60) Provisional application No. 61/156,310, filed on Feb. 27, 2009.

(51) Int. Cl.
*B60L 13/06* (2006.01)
*B60L 13/00* (2006.01)

(52) U.S. Cl.
USPC .......................................... 104/284; 104/292

(58) Field of Classification Search
USPC ......... 104/281, 283, 284, 287, 288, 290–292, 104/295; 105/3, 4.1, 4.2, 4.3, 157.1, 159, 105/215.1; 280/423.1, 476.1
See application file for complete search history.

(56) References Cited

U.S. PATENT DOCUMENTS

| 4,092,554 A | * | 5/1978 | Quinn | 104/292 |
| 4,981,082 A | * | 1/1991 | Wicks | 105/4.1 |
| 5,020,445 A | * | 6/1991 | Adams, Jr. | 105/4.1 |
| 5,826,517 A | * | 10/1998 | Larson et al. | 105/4.3 |
| 7,096,794 B2 | * | 8/2006 | Post | 104/281 |
| 7,654,203 B2 | * | 2/2010 | Roop et al. | 104/290 |
| 2009/0032350 A1 | * | 2/2009 | Shapery | 191/10 |

FOREIGN PATENT DOCUMENTS

| DE | 2 041 874 A1 | 3/1972 |
| DE | 2 151 543 A1 | 4/1972 |
| DE | 27 20 044 A1 | 11/1977 |
| DE | 42 10 925 A1 | 10/1993 |
| EP | 0 903 260 A1 | 3/1999 |
| GB | 2 195 966 A | 4/1988 |

OTHER PUBLICATIONS

The Notification of Transmittal of the International Search Report and the Written Opinion of the International Searching Authority, or the Declaration, for PCT/US2010/022436, mailed Mar. 29, 2011 (in 10 pages).

* cited by examiner

*Primary Examiner* — R. J. McCarry, Jr.
(74) *Attorney, Agent, or Firm* — Knobbe, Martens, Olson & Bear LLP

(57) ABSTRACT

Systems and methods of transporting containers are disclosed. In one embodiment, an apparatus for transporting shipping containers is provided. The apparatus is configured to move along rails of a railroad track. The apparatus comprises a coupling configured to couple with a trailer configured to transport shipping containers. The coupling is attached to a source of magnetic flux. The source of magnetic flux is positioned so as to be driven by a source of varying magnetic flux positioned along the railroad track. In one embodiment, the source of magnetic flux comprises one or more permanent magnets and the source of varying magnetic flux comprises at least one electromagnet.

24 Claims, 5 Drawing Sheets

CONTAINER TRANSPORT SYSTEM

CROSS-REFERENCE TO RELATED APPLICATIONS

This application claims priority under 35 U.S.C. §119(e) to U.S. Provisional Patent Application No. 61/156,310, filed Feb. 27, 2009, which is herein incorporated by reference in its entirety.

BACKGROUND

1. Field

The present invention relates to applications of linear motors, and in particular to container transport using a linear motor.

2. Description of the Related Technology

Each year, millions of containers are moved in ports around the country, mostly by fleets of trucks. Use of internal combustion based trucks to move these containers generates significant amounts of air pollution and carbon emissions. Thus, a need exists to move containers in more environmentally friendly way.

SUMMARY

The systems and methods disclosed herein each have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description of Certain Embodiments" one will understand how the sample features provide advantages that include a system for transporting shipping containers.

One aspect is an apparatus for transporting shipping containers along a track, comprising a source of magnetic flux and a coupling attached to the source of magnetic flux and configured to couple with a trailer configured to transport shipping containers, wherein the source of magnetic flux is positioned so as to be driven by a source of varying magnetic flux positioned along the track.

Another aspect is a container transport system comprising a track comprising one or more rails proximate to a paved surface, a first source of magnetic flux positioned along the track, a vehicle comprising a second source of magnetic flux and a coupling configured to couple the vehicle to a trailer configured to transport shipping containers, wherein the second source of magnetic flux is positioned so as to be driven by the first source of magnetic flux positioned along the track, and a control system configured to control at least one of the first and second sources of magnetic flux so as to move the vehicle along the track.

Another aspect is a method of transporting a trailer, the method comprising receiving a transport container loaded onto a trailer having wheels, the wheels having road tires, coupling the container to a vehicle comprising a source of magnetic flux and wheels configured to move along at least one rail, and controlling a source of varying magnetic flux positioned proximate to the at least one rail and configured to interact with the source of magnetic flux coupled of the vehicle so as to move the vehicle along the rail and to move the wheels of the trailer along a surface proximate to the rails.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

One embodiment is container transportation system that includes one or more helper car riding along a railroad track. The helper cars are configured to tow one or more trailers configured to receive shipping containers. Each helper car may include a source of magnetic flux such as a first portion of a linear induction motor and/or linear synchronous motor, e.g., permanent magnets. A second portion of the linear motor may be positioned proximal to the railroad tracks. The second portion of the motor may comprise a source of varying magnetic flux such as electromagnets positioned at specified locations along the railroad tracks. The system may further comprise a control/motor commutation system that is electrically coupled to, and controls, the electromagnets of the second portion of the linear motor so as to interact with a magnetic field generated by the first portion of the motor and thereby force the helper car along the track. The trailer is configured to be coupled to the helper car and towed by the helper car.

In one embodiment, the helper car has steel or other rail wheels that are shaped to ride on the rails of the railroad track while the trailer has rubber or other road tires that move along a paved portion proximal the railroad track. In one embodiment, the area outside the two rails of the track is paved so that the trailer wheels are able to roll over the paved area while the helper car moves along the rails of the railroad track. All or portions of the area of the railroad track between the rails may also be at least partially or completely paved. In one embodiment, the electromagnets of the motor positioned between the rails and optionally embedded within the paved portion of the track.

Figure 1:
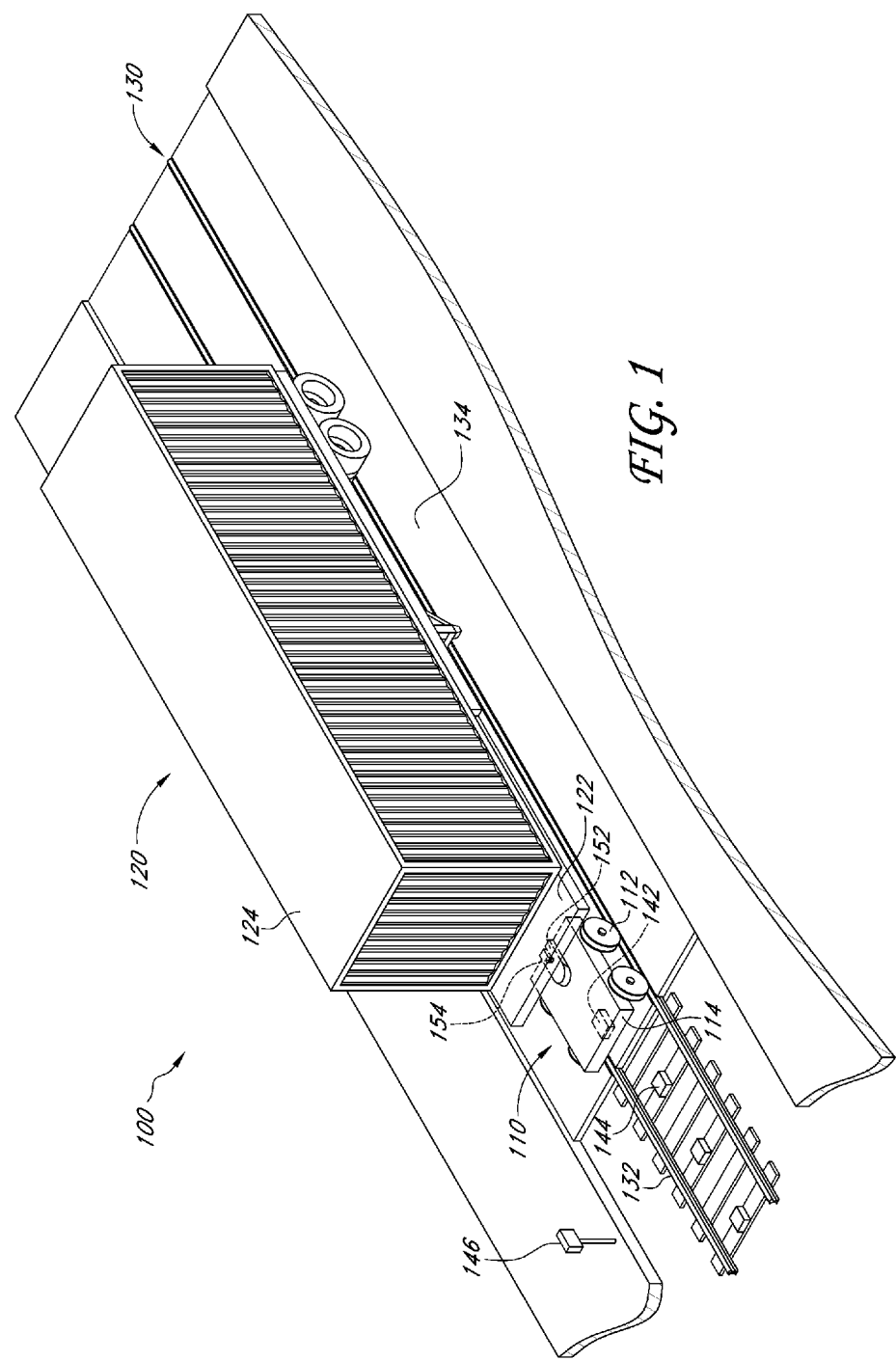
FIG. 1 is a perspective view of one embodiment of a container transport system.

FIG. 1 is an illustration of one embodiment of a container transport system. The system 100 includes a helper car 110 configured to tow a load 120 upon a track 130. The helper car 110 includes set of wheels 112 rotatably attached to a frame 114 via, e.g. one or more axles. The helper car 110 further includes a source of magnetic flux 142, such as a permanent magnet or an electromagnet. The track 130 also includes one or more sources of magnetic flux 144, such as permanent magnets or electromagnets, which are spaced along the track. The helper car source 142 and the track sources 144 interact to propel the car along the track as described below and as controlled by a control/motor commutation system 146. In one embodiment, the load 120 comprises a trailer 122 configured to carry a shipping container 124.

In one embodiment, the helper car 110 includes a set of wheels 112 configured to move along one or more rails 132 of the track 130, while the load 120 includes a trailer 122 configured to move along a paved portion 134 of the track 130. In one embodiment, the rails 132 include at least two substantially parallel rails separated by a gauge, each rail having a generally I-shaped profile with a head and a foot separated by a web. In one embodiment, the rails 132 comprise standard, or international, gauge rails. The wheels 112 of the helper car 110 can be shaped to ride along the head of the rail. The wheels 112 of the helper car 110 can include at least two wheel separated by the gauge of the rails 132. In one embodiment, the wheels 112 are steel. In one embodiment, the gauge is approximately 1,435 mm. The paved portion 134 includes a paved area outside rails 132. The paved portion 134 can also include paved areas between the rails 132. In one embodiment, the track sources 144 are embedded in the paved portion 134 between the rails. The trailer 122 can include wheels shaped for moving along the paved portion 134. In one embodiment, the wheels include a rubber tire. In other embodiments, the wheels 112 of the helper car 110 are designed to ride along specialized rails, or even a signal rail, such as in a monorail system.

In one embodiment, the helper car 110 includes a latching or coupling mechanism 152 which is complementary to a latching mechanism 154 of the load 120. In one embodiment, the latching mechanisms 152, 154 include a fifth wheel coupling such as used in commercially available truck and trailer systems. The fifth wheel coupling includes a coupling pin (or king pin) towards the front of the load 120 and a horseshoe-shaped coupling device toward the rear of the helper car 110. The coupling pin and coupling device are can be detachably engaged. In another embodiment, the load 120, including a semi-trailer is at least partially raised with a suspension, positioned over at least a portion of the helper car 110, and lowered to engage the complementary latching mechanisms 152, 154.

The helper car 110 is moved along the track by interaction of the helper car source 142 and the track sources 144 as controlled by a control/motor commutation system 146. The helper car source 142 and the track sources 144 can be configure to form a linear induction motor controlled by the control/motor commutation system 146.

In one embodiment, the helper car source 142 includes a permanent magnet. The permanent magnet can be a rare earth magnet, such as a neodymium magnet. A Halbach array augments the magnetic field on one side of the array while cancelling the field to near zero on the opposite side. Thus, in one embodiment, the helper car source 142 includes an array of permanent magnets arranged such that the magnetic flux is pointed downwards from the helper car 110 as positioned on the track 130 and towards the track sources 144 positioned on or in the ground.

In one embodiment, the track sources 144 include a number of electromagnets controlled by the control/motor commutation system 146. The electromagnets can be at least partially encased in concrete and paved over to form the paved portion 134 of the track as described above. The electromagnets can be connected to a power source. In one embodiment, multiple electromagnets are connected to a single power source. This connection can be in a serial or parallel fashion. In one embodiment, this connection can also be in a star layout, in which multiple electromagnets are directly connected to the power source.

In one embodiment, the control/motor commutation system 146 individually controls the magnetic flux produced by the track sources 144, such that the magnetic flux produced interacts with magnetic flux produced by the helper car source 142 to propel the helper car 110 along the track 130.

In another embodiment, the helper car source 142 includes an electromagnet and the track sources 144 include an array of permanent magnets arranged such that the magnetic flux is pointed upwards from the track 130 and towards the helper car source 142 positioned above. The control/motor commutation system 146 can vary the magnetic field produced by the helper car source 142 so as to propel the helper car 110 along the track 130. Multiple helper cars 110 can be wireless controlled by the control/motor commutation system 146.

Although the linear motor formed by the helper car source 142 and track source 146 can serve as a brake and can regenerate energy when the vehicle is slowed, as disclosed in U.S. patent application Ser. No. 12/184,524, filed Aug. 1, 2008 and hereby incorporated by reference in its entirety, the helper car 110 can also include an independent braking system such as an electric air pump drive to utilize an air brake system of a semi-trailer for added safety. In one embodiment, the drive is controlled, at least in part, based on information received from a set of sensors on the one or both of the latching mechanisms 152, 154 to limit the amount of braking pressure applied when the computer sends a signal to slow the trailer down. The electric air pump driver can provide more air brake when the sensor feels less pressure and limit it when the sensor feels too much pressure.

Figure 2A:
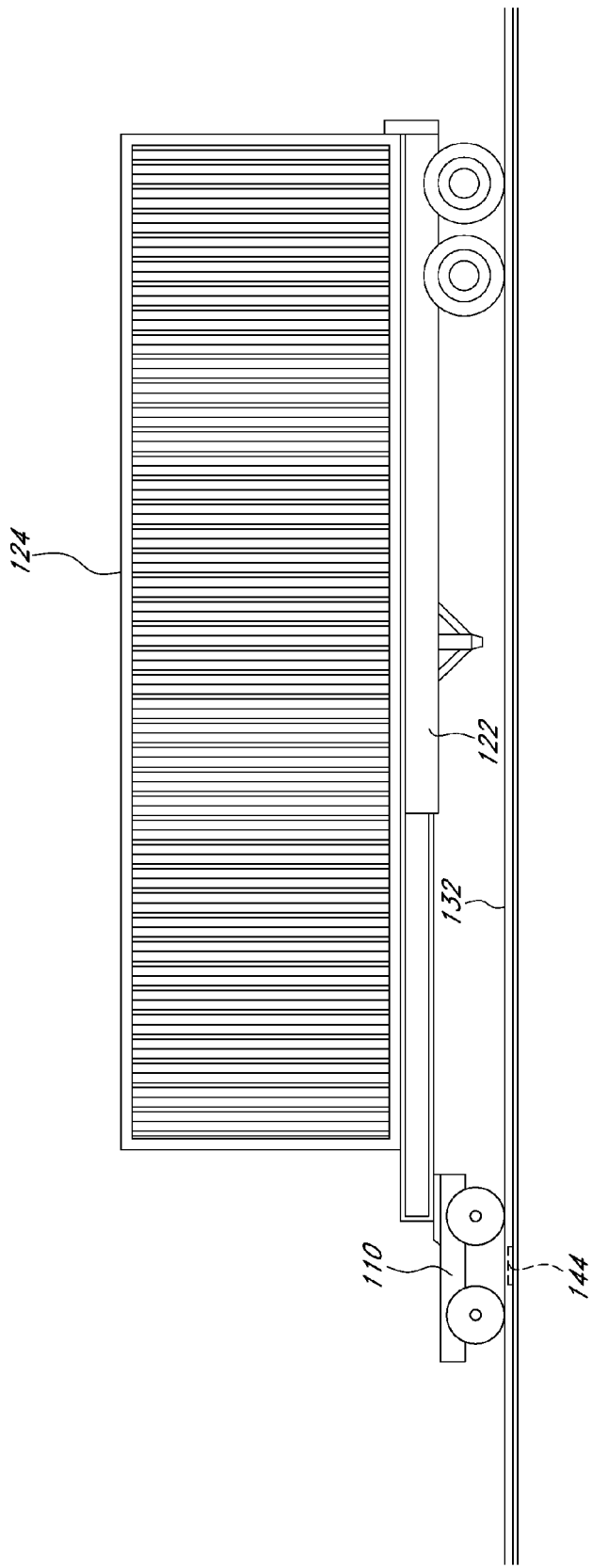
FIG. 2A is a side view of one embodiment of the system illustrated in FIG. 1.

FIG. 2A is a side view of the helper car 110 and the trailer 122 positioned on a set of rails 132. As discussed above, the helper car 110 can desirably tow the trailer 122 and container 124 without directly emitting air pollution and/or without need for an electrified rail or catenary wire.

Figure 2B:
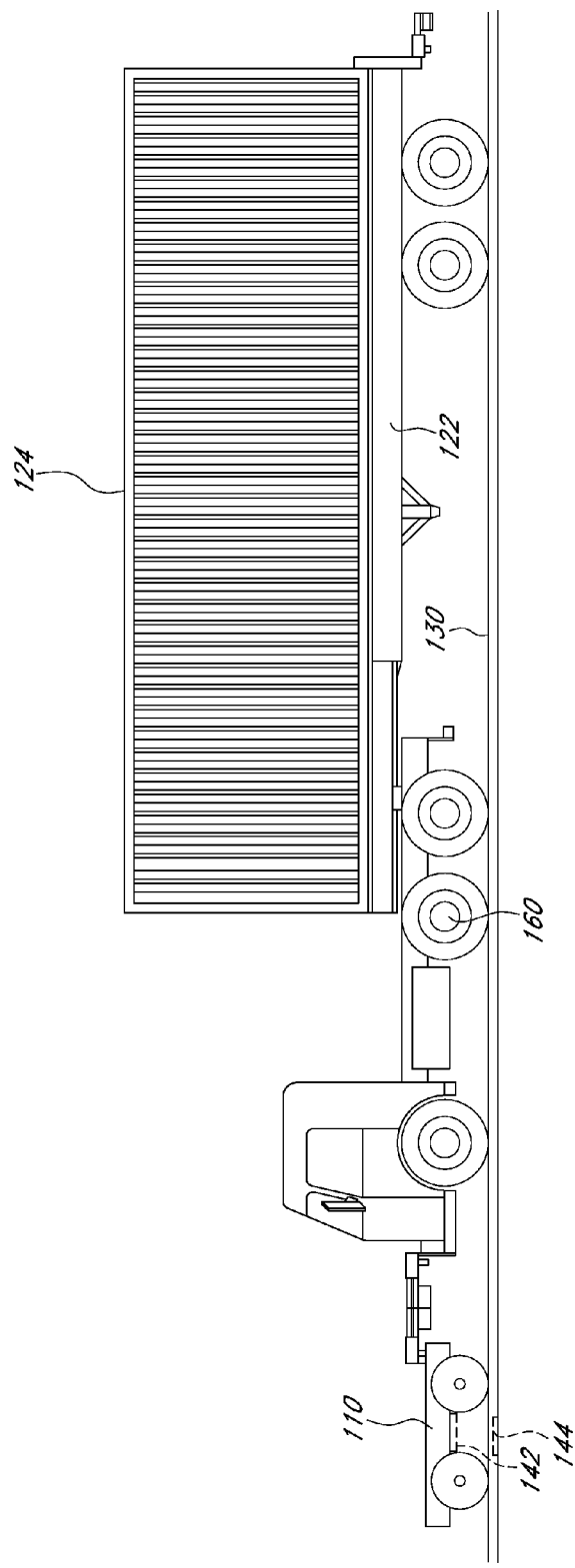
FIG. 2B is a side view of another embodiment of a container transport system.

FIG. 2B is a side view of another embodiment of a container transport system. In this embodiment, the helper car 110 is configured to tow a load 120 including a self-propelling vehicle 160, such as an electric truck, and a trailer 122. In this embodiment, the interaction of the helper car source 142 and the track source 144, properly commutated, can provide a propulsive force to move the load, as described above. Additionally, in one embodiment, the electric truck can also inductively recharge its capacitors and batteries while it is being magnetically moved, thus eliminating the need to park the truck for up to six hours while it fully recharges. Such an embodiment allows the electric truck to operate on the track 130 indefinitely without the need to stop and recharge.

Figure 3:
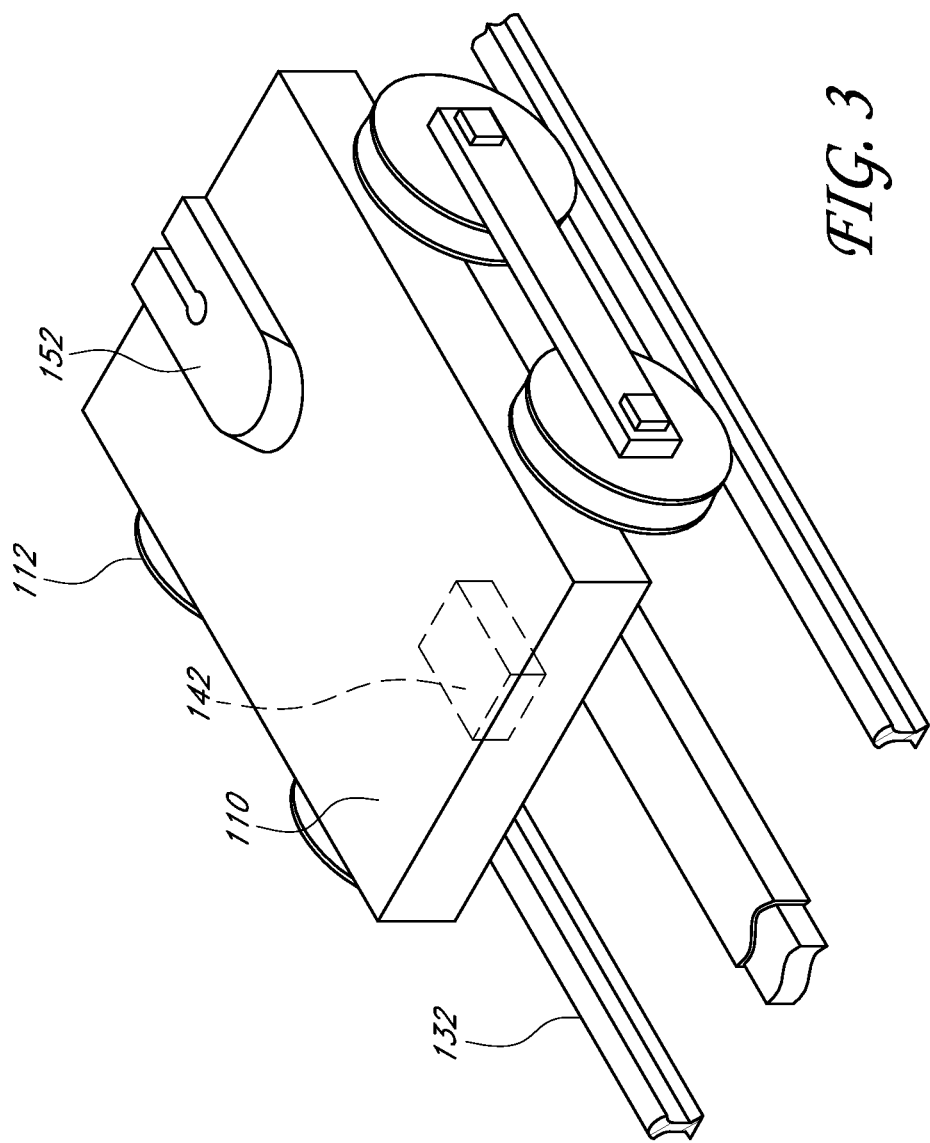
FIG. 3 is a perspective view of one embodiment of a helper car for use in a system such as illustrated in FIG. 1.

FIG. 3 is perspective view of one embodiment of the helper car 100 illustrated in FIG. 1. The helper car comprises a frame 110 and a set of wheels. In one embodiment, the wheels are designed and spaced to ride along standard railroad tracks. That is, the wheels comprise, for example, steel traction surfaces that are configured to ride along the head of the rails, and are spaced so as to fit on a set of tracks separated by a standard gauge. In other embodiments, the wheels are designed to ride along specialized tracks, or even a single track, such as in a monorail system. In one embodiment, the semi-trailer which is towed by the helper car is configured to ride along a paved road.

In one embodiment, the helper car 110 comprises a rail "bogey." A rail bogey generally includes a frame which supports at least two rail car wheels 112 rotatably mounted on an axle. The upper portion of the frame may include the latching mechanism 152 which is complementary related to a similar latching mechanism on a load, such as a trailer. In one embodiment, the trailer may be raised up via a suspension, positioned over the rail bogey, and lowered into engagement with the latching mechanism. The axle of the suspension is then raised out of engagement with the railroad surface, with the rail bogey providing the suspension and wheels for use on railroad tracks 132. In one embodiment, the helper car is a conventional rail bogey that is modified to include the source of magnetic flux 142. Hence, it one embodiment, conventional rail bogeys and trailers can be modified to cost effectively provide a transport system as described herein.

Figure 4:
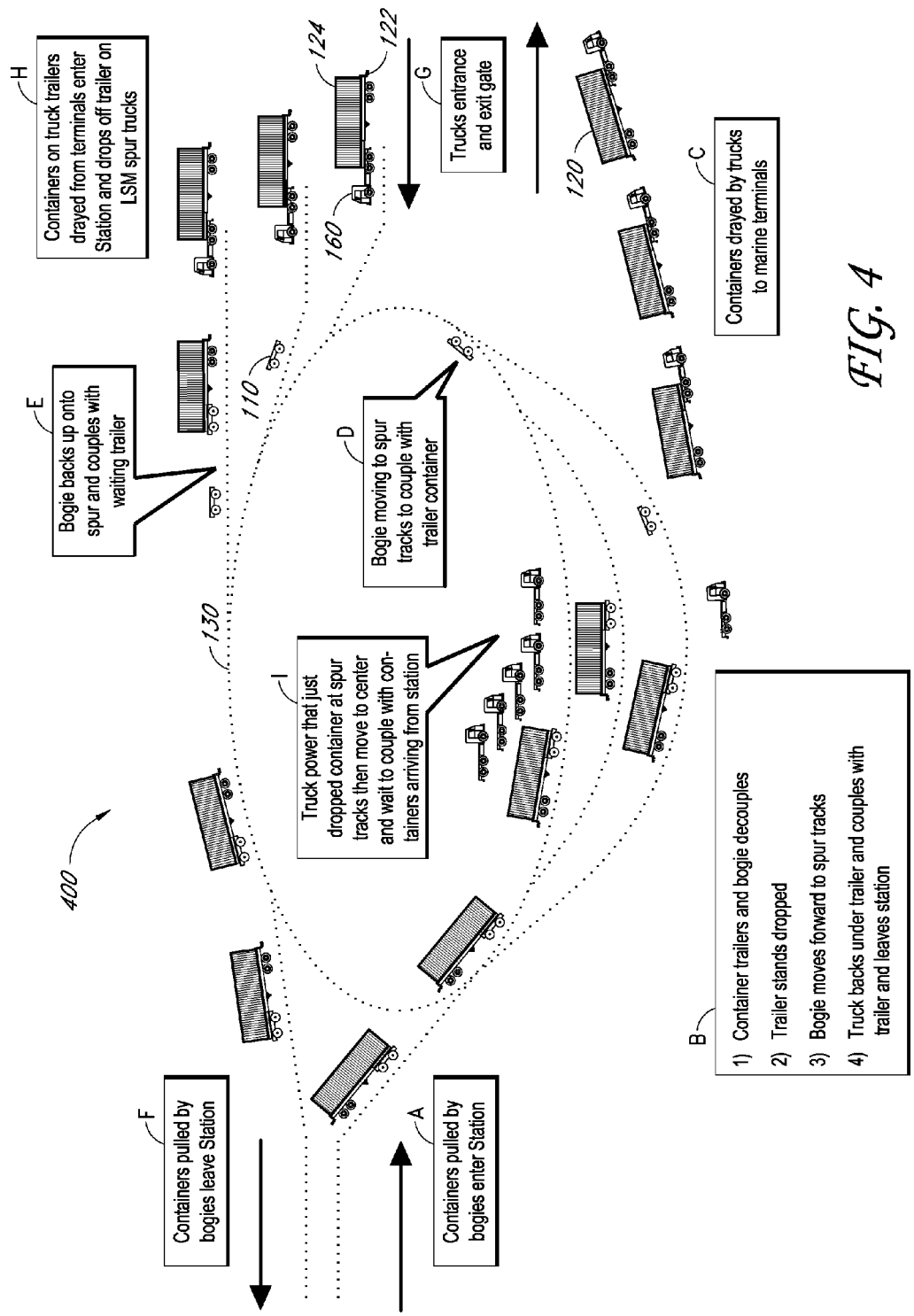
FIG. 4 is an operation flow diagram of a container transport station.

FIG. 4 is an operational flow diagram of a container collection station 400. In one embodiment, containers 124 are transferred from marine terminals to the station 400 by placing a container 124 onto a trailer chassis 122 and draying it to the station 400 either by a hostler or electric powered heavy duty truck 160. If the container 124 is grounded on a trailer 122, then the hostler or truck 160 hooks to the trailer and drives toward the station 400. If the container 124 is in a stack, marine terminal operations staff can pick it from the stack with their top or side pick and load it onto a trailer chassis 122. In one embodiment, container collection station and operations software is used to facilitate the interface.

In FIG. 4, at least two linear motor powered rail tracks 130 connecting from the main trunk line and adjacent and parallel to each other enter the station. Inside the station, the tracks separate by widening into an oval loop and eventually connect with each other (return loop). A step-by-step explanation of the process is as follows:

At event A, bogies 130 pulling containers 124 on trailers 122 enter the station 400 on the inbound rail track and move the containers 124 on trailers 122 to the unhooking area of the station 400. This is the area where the inbound line branches out into several parallel, also called ladder, tracks.

At event B, at the unhooking area of the rail loop, legs of the trailer 122 are dropped and the bogie 130 unhooks. In one embodiment, in which a shorter headway is desired, a hydraulic lift in the track section can be used to eliminate the need to drop the trailer's legs upon disconnection from the hostler and connection to the bogie 130. A truck 160 waiting nearby the unhooking area backs into the newly dropped trailer and couples with the trailer.

At event C, the truck 160 drays the container 122 to a marine terminal.

At event D, the bogie 130 that just unhooked the inbound trailer 122 moves down the rail line to the area of the loop where several spur lines are connected.

At event E, the bogies 130 backup into a spur line and hook with a trailer 122 and container 124 waiting to be hooked. When the new trailer is hooked, the bogie proceeds forward (around the loop) and exits (at event F) through the same gate that it entered the station, again adjacent and parallel to the inbound rail track.

During this process, other events regarding the trucks occur. At event G, trucks 160, with or without loads 120, enter and exit through a gate. At event H, the trucks 160 decouple from their loads 120. At event I, the trucks 160 move to the center of the station 400 and await coupling with loads 120 arriving at the station 400.

The exact land area of the station 400 can differ and will depend on the projected container volume from the nearby marine terminals, as well as the availability of space. The throughput capacity of the stations can differ but can also be pre-determined by the exact configuration planned for each station. In one embodiment enough land area is acquired to allow for additional parallel and spur lines to be added, making the stations' capacities expandable. Additionally, if for some reason it is not possible to expand a station's rail configuration, increasing volume and capacities can be achieved by using top-pick loading equipment to enhance and improve productivity. By employing top-pick equipment the station can operate as a hybrid drop-and-hook and lift-off/lift-on operation with latter relying on a certain amount of dedicated trailers attached to bogies at all times.

The bogies 130 pulling trailers 124 with containers 122 from the collection stations can deliver them to near-dock rail facilities. When the bogies 130 arrive at a near-dock facility from the station, the near-dock terminal's yard workers unhook the trailer from the bogie (if they are to be stored in a grounded position until loaded onto a train) or lift off the trailer with a top-pick or transtainer (mobile rubber tired gantry cranes, also called RTGs) equipment (if the containers need to be loaded directly to a waiting train or stacked and stored for later loading).

Operations can be modified by positioning mobile transtainers adjacent to the rail lines. In one embodiment, the trainstainer crane slides over to the line and lifts a container off a trailer as it stops while on the line, and slide back to its other side and place the container on a container stack, or vice-versa.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. An apparatus for transporting shipments along a track having two rails and a paved area, comprising:
    a first source of magnetic flux; and
    a coupling attached to the first source of magnetic flux and configured to couple with a trailer configured to transport shipments, wherein at least one wheel of the trailer rolls along the paved area of the track at least when the coupling is coupled with the trailer and when the coupling moves along the track,
    wherein the first source of magnetic flux is positioned so as to be driven by a second source of magnetic flux positioned along the track, wherein the second source of magnetic flux is a source of varying magnetic flux.

2. The apparatus of claim 1, wherein the first source of magnetic flux comprises one or more permanent magnets and wherein the second source of magnetic flux comprises at least one electromagnet.

3. The apparatus of claim 2, wherein the permanent magnets define a first portion of a linear motor and the electromagnet positioned along the track comprises a second portion of the linear motor.

4. The apparatus of claim 3, wherein the linear motor comprises at least one of a linear synchronous motor or a linear induction motor.

5. The apparatus of claim 1, further comprising:
    a frame configured to attach the first source of magnetic flux to the coupling;
    a plurality of wheels configured to rotate along the track; and
    at least one axle configured to attach the wheels to the frame.

6. The apparatus of claim 1, wherein the coupling comprises a fifth wheel coupling.

7. The apparatus of claim 1, further comprising an electric air pump drive configured to drive an air brake of the coupling, wherein the air pump is coupled with an air brake system of the trailer.

8. The apparatus of claim 7, further comprising:
    at least one sensor attached to the coupling configured to sense a braking pressure; and a controller configured to control the electric air pump drive based at least in part on information received from the sensor.

9. The apparatus of claim 1, wherein the coupling is configured to be coupled to only one trailer at a time.

10. A shipment transport system comprising:
a track comprising one or more rails and a paved surface;
a first source of magnetic flux positioned along the track;
a vehicle comprising:
   a second source of magnetic flux; and
   a coupling configured to couple the vehicle to a trailer configured to transport shipments, wherein at least one wheel of the trailer rolls over the paved surface at least when the vehicle moves along the track and when the trailer is coupled with the vehicle,
   wherein the second source of magnetic flux is positioned so as to be driven by the first source of magnetic flux positioned along the track; and
a control system configured to control at least one of the first and second sources of magnetic flux so as to move the vehicle along the track.

11. The system of claim 10, wherein the track comprises at least two rails.

12. The system of claim 11, wherein the two rails are separated by a gauge and the first set of wheels comprises at least two steel wheels separated by the gauge.

13. The system of claim 10, wherein the paved surface includes a first paved portion between two rails and a second paved portion outside the two rails.

14. The system of claim 10, wherein at least a portion of the first source of magnetic flux is embedded in the first paved portion.

15. The system of claim 10, wherein the first source of magnetic flux comprises an electromagnet.

16. The system of claim 10, wherein the second source of magnetic flux comprises a permanent magnet.

17. The system of claim 10, wherein the second source of magnetic flux comprises a rare earth magnet.

18. The system of claim 17, wherein the second source of magnetic flux comprises a Halbach array.

19. The system of claim 10, wherein the coupling comprises a fifth wheel coupling.

20. The system of claim 10, wherein the at least one wheel of the trailer comprises a rubber tire.

21. The system of claim 10, wherein the control system controls at least one of the first or second source of magnetic flux to operate the sources as a linear motor.

22. The system of claim 10, wherein the vehicle is configured to coupled to only one trailer at a time.

23. A method of transporting a trailer, the method comprising:
receiving a trailer having a plurality of tires;
coupling the trailer to a vehicle comprising a first source of magnetic flux and a plurality of wheels configured to move along a track having a second source of magnetic flux and a paved surface; and
varying the second source of magnetic flux to move the vehicle along the track, wherein moving the vehicle along the track rolls the tires of the trailer along the paved surface of the track.

24. The method of claim 23, further comprising moving the vehicle along the track between a first station and a second station, the vehicle being coupled to the trailer when moving between the first station and the second station, and the tires of the trailer rolling along the paved surface of the track when the vehicle moves between the first station and the second station.

* * * * *